United States Patent
Chao et al.

(10) Patent No.: US 9,183,185 B2
(45) Date of Patent: Nov. 10, 2015

(54) INSERTING CONTENT AND EXCLUSION ZONE(S) INTO A PAGE

(75) Inventors: Hui Chao, San Jose, CA (US); C. Brian Atkins, Lexington, KY (US); Daniel R. Tretter, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 293 days.

(21) Appl. No.: 13/809,710

(22) PCT Filed: Jul. 29, 2010

(86) PCT No.: PCT/US2010/043635
§ 371 (c)(1),
(2), (4) Date: Jan. 11, 2013

(87) PCT Pub. No.: WO2012/015406
PCT Pub. Date: Feb. 2, 2012

(65) Prior Publication Data
US 2013/0124981 A1 May 16, 2013

(51) Int. Cl.
G06F 17/00 (2006.01)
G06F 17/21 (2006.01)
G06T 11/60 (2006.01)

(52) U.S. Cl.
CPC ............ *G06F 17/212* (2013.01); *G06F 17/211* (2013.01); *G06T 11/60* (2013.01)

(58) Field of Classification Search
CPC ..... G06F 17/24; G06F 17/211; G06F 17/212; G06F 17/217; G06F 3/0484; G06F 3/04842
See application file for complete search history.

(56) References Cited

U.S. PATENT DOCUMENTS

| 5,214,755 | A | 5/1993 | Mason |
| 5,442,778 | A * | 8/1995 | Pedersen et al. ...................... 1/1 |
| 5,937,417 | A * | 8/1999 | Nielsen .......................... 715/207 |
| 6,373,590 | B1 * | 4/2002 | Ancin et al. ................. 358/1.18 |
| 6,727,909 | B1 | 4/2004 | Matsumura et al. |
| 7,243,325 | B2 * | 7/2007 | McIntyre et al. ............... 716/55 |
| 7,392,473 | B2 | 6/2008 | Meunier |
| 7,734,644 | B2 * | 6/2010 | Gras ............................ 707/770 |
| 2002/0078035 | A1 * | 6/2002 | Frank et al. ....................... 707/3 |
| 2003/0099526 | A1 | 5/2003 | Saw |
| 2003/0215136 | A1 | 11/2003 | Chao |

(Continued)

FOREIGN PATENT DOCUMENTS

CN 101523887 A 9/2009

OTHER PUBLICATIONS

Yuli Gao et al, MagicPhotobook: Designer Inspired, User Perfected Photo Albums, Pub Date 2009, 979-980.
Atkins, Adaptive Photo Collection Page Layout, 2004 International Conference on Image Processing (CIP), pp. 2897-2900 (2004).
Atkins, Blocked Recursive Image Composition, pp. 821-824 (Oct. 2008).

(Continued)

*Primary Examiner* — Laurie Ries
(74) *Attorney, Agent, or Firm* — Trop, Pruner & Hu

(57) ABSTRACT

Information relating to an exclusion zone to be provided on a page is received (102), where the exclusion zone defines a corresponding area of the page that is free of content to be inserted in the page. A layout defining plural partitions on the page is produced (104), where the layout includes the exclusion zone and the content having a plurality of elements that are inserted by recursively defining the plural partitions on the page, where the exclusion zone and content elements are provided in respective ones of the plural partitions, and where recursively defining the plural partitions considers presence of the exclusion zone.

20 Claims, 12 Drawing Sheets

(56) References Cited

U.S. PATENT DOCUMENTS

| | | | |
|---|---|---|---|
| 2004/0028290 A1* | 2/2004 | Gamble | 382/284 |
| 2004/0205081 A1 | 10/2004 | Chao | |
| 2005/0071783 A1 | 3/2005 | Atkins | |
| 2005/0168782 A1* | 8/2005 | Kobashi et al. | 358/1.18 |
| 2005/0193327 A1 | 9/2005 | Chao | |
| 2005/0276477 A1 | 12/2005 | Lin | |
| 2006/0026508 A1 | 2/2006 | Balinsky | |
| 2006/0103891 A1* | 5/2006 | Atkins | 358/450 |
| 2006/0107204 A1* | 5/2006 | Epstein | 715/517 |
| 2006/0150092 A1 | 7/2006 | Atkins | |
| 2006/0179405 A1 | 8/2006 | Chao | |
| 2006/0200758 A1 | 9/2006 | Atkins | |
| 2006/0236230 A1 | 10/2006 | Lin | |
| 2006/0257048 A1 | 11/2006 | Lin | |
| 2006/0259856 A1 | 11/2006 | Atkins | |
| 2006/0279566 A1 | 12/2006 | Atkins | |
| 2006/0294460 A1 | 12/2006 | Chao | |
| 2007/0022003 A1 | 1/2007 | Chao | |
| 2007/0110335 A1 | 5/2007 | Taylor et al. | |
| 2007/0136264 A1* | 6/2007 | Tran | 707/4 |
| 2007/0253028 A1* | 11/2007 | Widdowson | 358/1.18 |
| 2008/0082912 A1 | 4/2008 | Atkins | |
| 2008/0205694 A1* | 8/2008 | Sagoo et al. | 382/100 |
| 2008/0313533 A1 | 12/2008 | Hoyer et al. | |
| 2009/0002764 A1 | 1/2009 | Atkins | |
| 2009/0016605 A1 | 1/2009 | Chao | |
| 2009/0060396 A1* | 3/2009 | Blessan et al. | 382/317 |
| 2009/0089660 A1* | 4/2009 | Atkins et al. | 715/243 |
| 2009/0235158 A1 | 9/2009 | Rosenstein et al. | |
| 2010/0077295 A1* | 3/2010 | Ichino | 715/235 |
| 2010/0174732 A1* | 7/2010 | Levy et al. | 707/768 |
| 2010/0174976 A1* | 7/2010 | Mansfield et al. | 715/234 |
| 2010/0199227 A1* | 8/2010 | Xiao et al. | 715/863 |
| 2012/0026187 A1 | 2/2012 | Chao | |
| 2012/0134576 A1* | 5/2012 | Sharma et al. | 382/155 |
| 2012/0284595 A1 | 11/2012 | Lyons et al. | |

OTHER PUBLICATIONS

B. Yang, T. Mei, L.-F. Sun, S.-Q. Yang, X.-S. Hua, Freeshaped video collage, In International Conference on Multi-Media Modeling (MMM). Kyoto, Japan. 2008 (11 pages).

Badros et al., The Cassowary Linear Arithmetic Constraint Solving Algorithm, ACM Transactions on Computer-Human Interaction, vol. 2, 2002 (39 pages).

Badros et al., The Cassowary Linear Arithmetic Constraint Solving Algorithm: Interface and Implementation, Technical Report UW-CSE-98-06-04, Jun. 29, 1998 (31 pages).

Balinsky et al., Aesthetically-Driven Layout Engine, ACM DocEng 2009 (pp. 119-122).

C. Rother, L. Bordeaux, Y. Hamadi and A. Blake, Autocollage. SIGGRAPH06, 2006 (6 pages).

Geigel et al., Using Genetic Algorithms for Album Page Layouts, IEEE Multimedia, 2003 (pp. 16-26).

Hurst et al., Review of automatic document formatting, ACM DocEng 2009 (pp. 99-108).

J. Wang, J. Sun, L. Quan, X. Tang, H.-Y. Shum. Picture Collage, IEEE CVPR 2006 (8 pages).

Korean Intellectual Property Office, International Search Report and Written Opinion for PCT/US2010/043635 dated Apr. 15, 2011 (9 pages).

L. Purvis, S. Harrington, B. O'?Sullivan and E. Freuder, Creating Personalized Documents: An Optimization Approach, ACM DocEng. 2003 (10 pages).

Office Actions/Replies of File History of U.S. Appl. No. 12/845,845, dated Dec. 11, 2013, Oct. 11, 2013, Jun. 20, 2013, Jan. 31, 2013, Nov. 19, 2012, and Aug. 22, 2012 (110 pages).

www.cs.washington.edu/research/constraints/cassowary/—Cassowary Constraint Solving Toolkit (Cassowary project at SourceForge.net—Nov. 18, 2005 (3 pages).

* cited by examiner

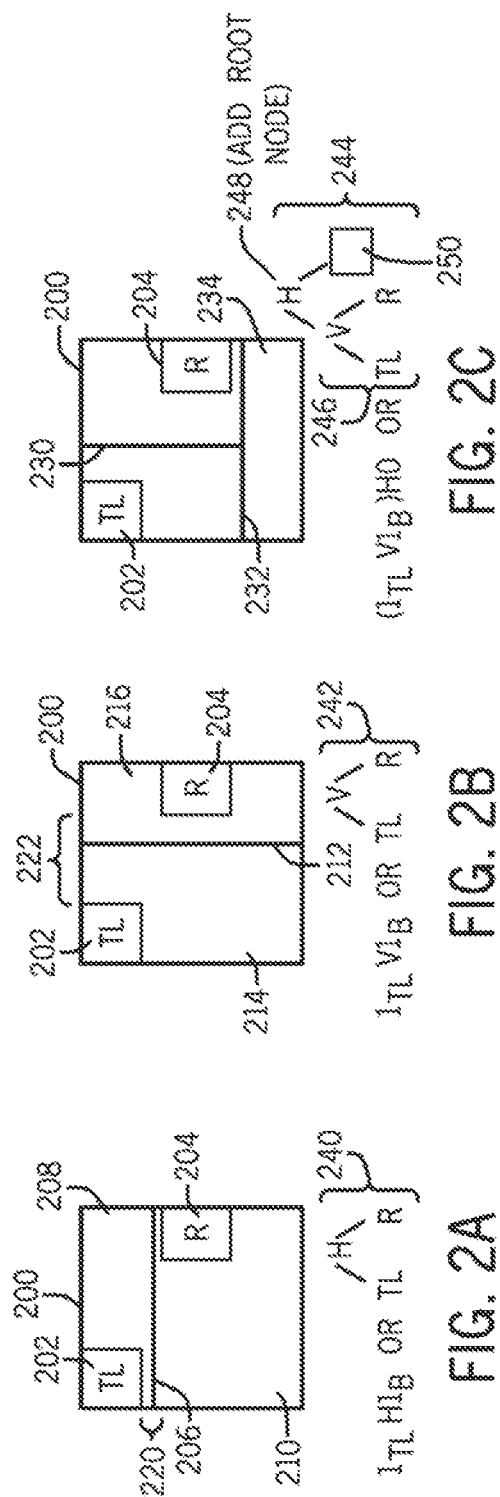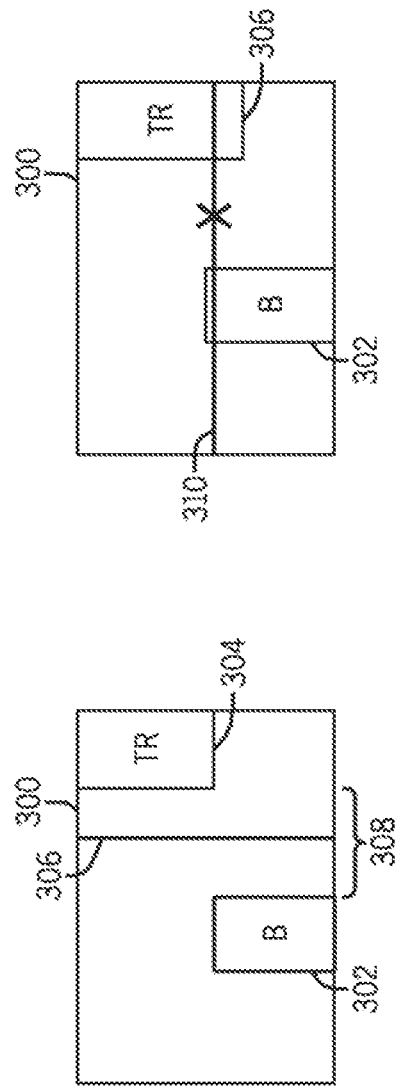

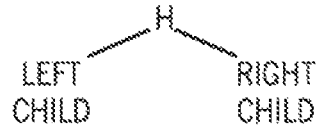 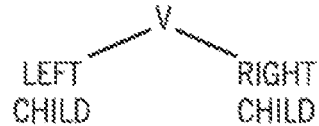
FIG. 4A  FIG. 4B
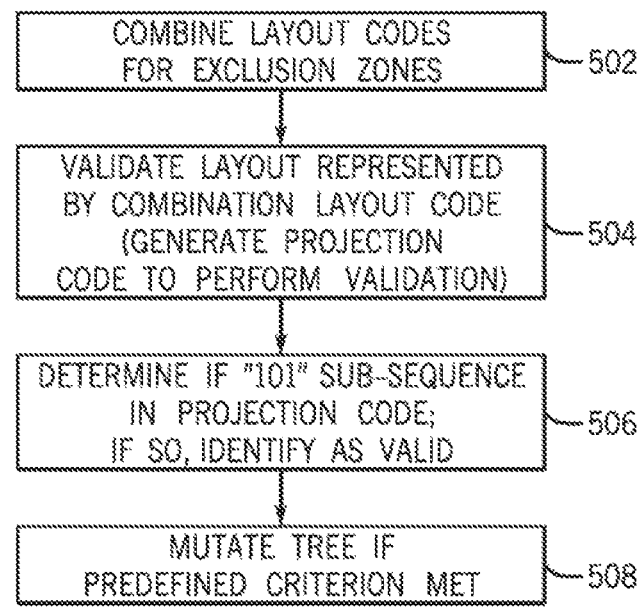
FIG. 5

(OPTION 1)

(OPTION 2)

(OPTION 3)

(OPTION 4)

"R" NODE REPLACED WITH OPTION 2

"R" NODE REPLACED WITH OPTION 3

"TL" NODE REPLACED WITH OPTION 2

"TL" NODE REPLACED WITH OPTION 4

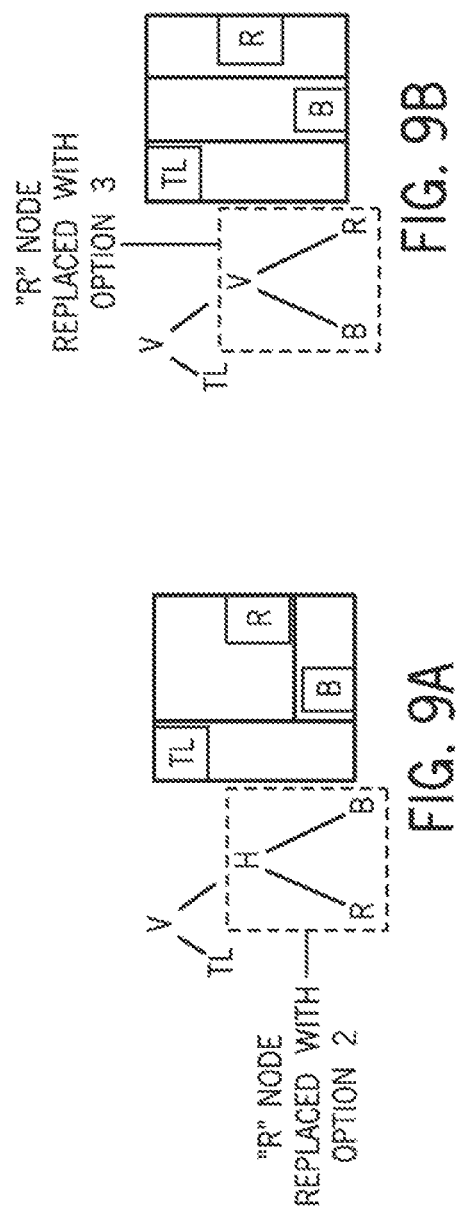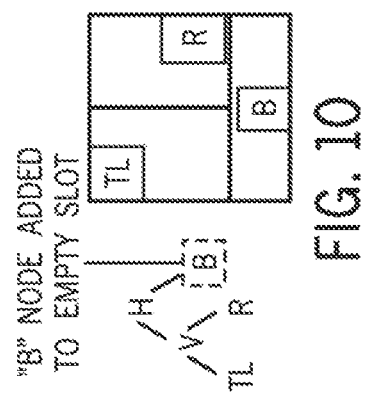

INSERTING CONTENT AND EXCLUSION ZONE(S) INTO A PAGE

CROSS-REFERENCE TO RELATED APPLICATION

This application is a national stage application under 35 U.S.C. §371 of PCT/US2010/043635, filed Jul. 29, 2010.

BACKGROUND

Digital images are easily acquired from various sources, such as over the web, through use of digital cameras, and so forth. An individual or organization may wish to create collages of digital images, where a collage of digital images refers to some arrangement of the images on a page. However, it can be challenging to arrange collections of images onto a page in an efficient manner.

BRIEF DESCRIPTION OF THE DRAWINGS

Some embodiments are described with respect to the following figures:

FIGS. 2A-2C, 3A-3B 7A-7B, 8A-8B, 9A-9B, and 10 illustrate examples of layouts for containing exclusion zones according to various examples;

FIGS. 4A-4B illustrate a tree having a horizontal cut and a tree having a vertical cut respectively, in accordance with some examples;

FIG. 5 is a flow diagram of a process according to further examples;

DETAILED DESCRIPTION

A collage of images arranged on one or multiple pages can be used for various purposes, including storytelling, marketing, project presentation, event highlighting, and so forth. A "page" refers to an overall region on which content (including images) can be placed. A page can also be referred to as a "canvas." The page can be a piece of paper or some other physical object, or the page can be a digital representation of a region in which content is to be provided. In implementations discussed herein, the content that is to be provided on a page (or pages) includes images, such as photographs, an area of text and/or graphics, and so forth, in other implementations, content that can be provided on a page can include other types of content, including physical elements such as patterns drawn on a garment, and so forth.

Various layout algorithms can be provided to dynamically arrange content on a page. However, typical layout algorithms do not account for the presence of exclusion zones on a page. An "exclusion zone" refers to an area on the page that is free of content (e.g., images) to be inserted into the page. In other words, an exclusion zone is an area where content to be placed on the page is not allowed to overlap. Examples of exclusion zones include background artwork or pre-existing text or graphics in specific locations of the page. Exclusion zones can also merely be blank spaces on the page where an author wishes not to have content be placed. Given a collection of content to be placed on a page, techniques or mechanisms according to some implementations are provided that enable placement of the content on the page that considers the presence of exclusion zone(s) on the page.

In the ensuing discussion, reference is made to inserting or placing images onto a page. In alternative implementations, techniques or mechanisms discussed below can be applied for placing or inserting other content on a page.

A. Layout of Exclusion Zones and Content

Figure 1A:
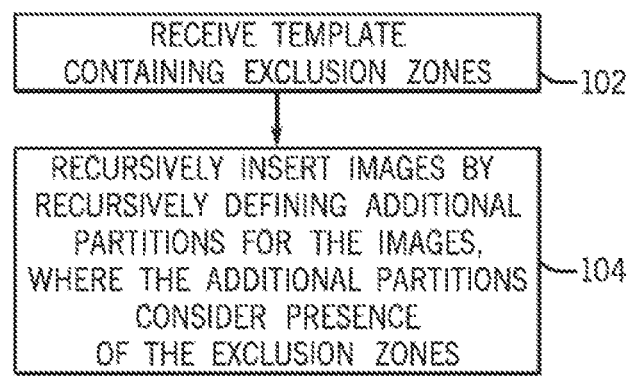
FIG. 1A is a flow diagram of a process according to some examples.

As depicted in FIG. 1A, in accordance with some implementations, a system receives (at 102) a template having a layout defining plural partitions on a page, where the template includes exclusion zone(s) included in respective partition(s). Each exclusion zone defines a corresponding area of the page that is free of content to be inserted in the page. The layout of the template is represented by a representation that specifies one or multiple cuts in the page that define the partitions.

A "cut" refers to a dividing structure that divides a portion of a page into different parts. Note that the dividing structure is not necessarily visible in the output that is generated for the layout—the dividing structure is typically a logical construct used for defining partitions on a given page. In some implementations, the cuts are horizontal cuts or vertical cuts. A horizontal cut refers to a horizontal dividing structure that divides a portion of a page between an upper part and a lower part. A vertical cut refers to a vertical dividing structure that divides a portion of a page between a left part and a right part.

After receiving the template, the system inserts (at 104) content into the template, wherein the content includes a plurality of elements (e.g., images) that are inserted into the template by recursively defining additional partitions on the page, where the additional partitions are to contain the respective elements of the content. The defining of the additional partitions considers presence of the exclusion zone(s). Inserting the content into the template causes production of an output layout that defines partitions containing respective ones of the exclusion zones and the content elements.

The representation of a layout that has multiple partitions containing respective exclusion zones can be in the form of a tree that has an arrangement of nodes, including leaf nodes and non-leaf nodes. The leaf nodes of the tree define areas on the page for exclusion zones and/or images, while the non-leaf nodes represent cuts, either horizontal cuts or vertical cuts. Such a tree is also referred to as an arrangement of guillotinable structures, where an arrangement of guillotinable structures define a guillotinable layout that can be successively divided by the addition of horizontal and/or vertical cuts.

In implementations where the representation is in the form of a tree, the definition of additional partitions for insertion of content elements (e.g., images) is accomplished by adding corresponding nodes (both non-leaf nodes for the respective content elements and non-leaf nodes for the respective cuts for defining the additional partitions).

Although FIG. 1A depicts implementations in which a template is received containing exclusion zones followed by insertion of content elements into such template, it is also possible in alternative implementations to first receive a layout having content elements followed by insertion of exclusion zones. In such alternative implementations, information is received relating to the exclusion zones. In the FIG. 1A implementations, the received information relating to the exclusion zones can include a template as discussed in connection with FIG. 1A. In the alternative implementations noted above, the received information relating to the exclusion zones can include other types of information that define positions and sizes of the exclusion zones on the page that allow for placement of the exclusion zones and content elements on the page.

Using the information relating to the exclusion zones, a system can then produce a layout defining multiple partitions on the page, where the layout includes the exclusion zones and the content elements that are inserted into the page by recursively defining the multiple partitions on the page such that the elements and exclusion zones are provided in respective ones of the plural partitions. The definition of the multiple partitions considers presence of the exclusion zones.

Figure 1B:
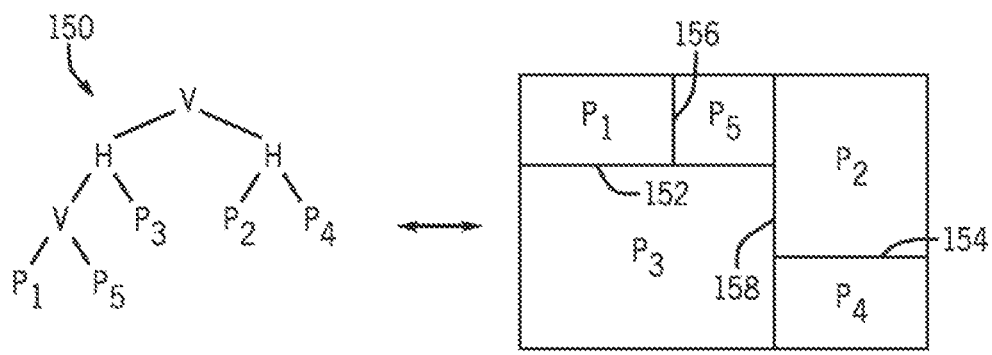
FIG. 1B illustrates a layout tree mapped to partitions on a page for containing images and exclusion zones, in accordance with some examples.

FIG. 1B illustrates an example tree 150 that represents a layout of partitions $p_1$, $p_2$, $p_3$, $p_4$, and $p_5$ to contain respective exclusion zones and images, and horizontal cuts (H) 152, 154 and vertical cuts (V) 156, 158.

Although FIG. 1A indicates the receipt (102) of one template, note that multiple templates having respective different layouts can be received, wherein the different layouts define respective different arrangements of partitions for containing respective exclusion zones. In this scenario, the insertion of content elements (104) would be performed with respect to each of the different templates, with multiple potential solutions possible from which an optimal (or near-optimal) solution can be selected.

In accordance with some implementations, when laying out images onto a page that has exclusion zone(s), at least some of the following criteria are considered:

(a) exclusion zone(s) (is) are specified and respected—images do not overlap with the exclusion zone(s);

(b) image aspect ratios are respected;

(c) image borders and spacing between adjacent image borders are specified;

(d) images should be placed around the exclusion zone(s) as closely as possible;

(e) if the artwork of exclusion zone(s) has symmetry along a particular axis, the layout of images should keep similar symmetry (where "artwork" refers to any graphics or text in the exclusion zone(s);

(f) image areas should be proportional to positive relative area values supplied with the images (relative area values can be supplied with images specify that the images should have predefined relative sizes among each other, e.g., image 1 should be ½ the size of image 2, etc); and (g) images in aggregate should occupy a maximum of the page area.

In some examples, criteria (a) and (b) are considered primary criteria that have to be satisfied, while criteria (c)-(g) are secondary criteria that should be satisfied (in other words, it would be desirable to satisfy the secondary criteria but such secondary criteria do not have to be satisfied if not possible).

In other implementations, alternative or additional criteria can be specified for producing a layout of images on a page having exclusion zone(s).

In the ensuing discussion, Section B discusses the building of candidate templates containing exclusion zones, and Section C discusses various techniques to insert images into the templates containing exclusion zones.

B. Building Candidate Templates Containing Exclusion Zones

Candidate templates that contain exclusion zones are generated, where the candidate templates are used as starting points for insertion of images of a collection. Each candidate template is defined by a corresponding layout that has plural partitions for dividing a page, where exclusion zones on the page are located in respective ones of the partitions.

The process of building a candidate template identifies exclusion zones on a page onto which images (or other content) are to be placed. A representation (e.g., a tree as discussed above) of a layout of the page is then generated, where the layout has multiple partitions that divide the page. The identified exclusion zones are provided in respective ones of the partitions. Depending on the number of exclusion zones on the page, the generation of the representation (e.g., a tree) can be performed in a recursive manner, in which vertical and/or horizontal cuts are successively added to define additional partitions for containing additional exclusion zones. The representation of the layout that is generated provides a candidate template containing exclusion zones, where images (or other content) can be inserted into this template.

In some implementations, note that for a given set of exclusion zones, there can be multiple possible layouts that specify different arrangements of partitions on a page. These multiple possible layouts are considered candidate layouts that can be used to form the templates that are to be used for inserting images (or other content).

FIGS. 2A-2C illustrate three possible layouts given presence of exclusion zones 202 and 204 on a page 200. FIG. 2A shows a horizontal cut 206 that divides the page 200 between an upper partition 208 and a lower partition 210, where the upper partition 208 contains the exclusion zone 202 and the lower partition 210 contains the exclusion zone 204.

FIG. 2B shows a different layout, which includes a vertical cut 212 to divide the page 200 into a left partition 214 and a right partition 216 for containing the exclusion zones 202 and 204, respectively. Note that in the examples of FIGS. 2A and 2B, both layouts are valid layouts, since each of the horizontal cut 206 and vertical cut 212 can be defined without intersecting any of the exclusion zones 202 and 204. Effectively, in FIG. 2A, there is a horizontal gap 220 between the exclusion zones 202 and 204, such that the horizontal cut 206 can be provided in this gap 220. Similarly, in FIG. 2B, there is a gap 222 between the exclusion zones 202 and 204, where the vertical cut 212 can be provided in this gap 222.

In a different example, as shown in FIGS. 3A-3B, exclusion zones 302 and 304 are present on a page 300. In FIG. 3A, a vertical cut 306 is depicted, which is a valid cut since the vertical cut 306 can be provided in a vertical gap 308 between the exclusion zones 302 and 304. On the other hand, as depicted in FIG. 3B, a horizontal cut 310 is not a valid cut for the exclusion zones 302 and 304, since there is no horizontal cut 310 that is possible that does not intersect any of the exclusion zones 302 and 304. In other words, there is no horizontal gap existing between the exclusion zones 302 and 304. Therefore, for the exclusion zones 302 and 304 on the page 300, the layout corresponding to the horizontal cut 310 is considered to be an invalid layout that cannot be used as a template.

FIG. 2C illustrates a different layout in which, after a vertical cut 230 was defined between the exclusion zones 202 and 204, a horizontal cut 232 has been added. The addition of the horizontal cut 232 refers to a mutation of the tree that represents the layout of FIG. 2C by adding a root node to the tree that corresponds to the horizontal cut 232. Note that the addition of the horizontal cut 232 defines a partition 234 that does not contain an exclusion zone. This partition 234 is considered an empty partition that can be used for placement of an incoming image or another exclusion zone, for example.

According to some implementations, to allow for efficient computation of representations of candidate layouts given a collection of exclusion zones, an encoding scheme is employed that defines different codes corresponding to different locations of exclusion zones. There are nine possible positions of an exclusion zone: TL, which represents the top, left corner of the page; TR, which represents the top, right corner of the page; BL, which represents the bottom, left corner of the page; BR, which represents the bottom, right corner of the page; T, which represents a top position on the page; B, which represents a bottom position on the page; L, which represents a left position on the page; R, which represents the right position on the page; and M, which represents a middle position on the page.

When forming a tree (to represent a layout of exclusion zones) given a particular location of an exclusion zone, the location of the exclusion zone can constrain where the exclusion zone is to be placed relative to a corresponding cut, either a horizontal cut or a vertical cut. Each of FIGS. 4A and 4B illustrates a portion of a tree that represents a portion of a layout. "H" in FIG. 4A represents a horizontal cut, which "V" in FIG. 4B represents a vertical cut. In the tree of FIG. 4A, H has two child nodes, a left child node, and a right child node. The left child node in FIG. 4A represents the upper partition above the horizontal cut represented by H, whereas the right child node represents the lower partition below the horizontal cut (H). In FIG. 4B, the left child node represents the left partition of the vertical cut represented by V, whereas the right child node represents the right partition of the vertical cut (V).

In FIG. 2A, the exclusion zone 202 is in the TL position, whereas the exclusion zone 204 is in the R position. Thus, the tree that represents the layout of FIG. 2A is depicted as 240 in FIG. 2A, where "TL" represents exclusion zone 202, and R represents exclusion zone 204, while H represents the horizontal cut 206. A tree 242 represents the layout of FIG. 2B, while a tree 244 represents the layout of FIG. 2C. In the tree 244 of FIG. 2C, a sub-tree 246 was formed after addition of the vertical cut 230 but before addition of the horizontal cut 232. To add the horizontal cut 232, a root node (H) 248 was added. A left child node of the root node 248 is the sub-tree 246, while the right child node of the root node 248 is an empty slot 250 that corresponds to the empty partition 234 in FIG. 2C.

For an exclusion zone of a given type, there are several possible ways to start a tree. These possibilities (referred to as "branch kernels") are depicted in Table 1 below:

TABLE 1 the possible branch kernels for each type of exclusion zone

| Exclusion zone type | TL | TR | BL | BR | T | B | L | R | M |
|---|---|---|---|---|---|---|---|---|---|
| Possible ways to start a tree | $1_{TL}H0$ $1_{TL}V0$ | $1_{TR}H0$ $0V1_{TR}$ | $0H1_{BL}$ $1_{BL}V0$ | $0H1_{BR}$ $0V1_{BR}$ | $1_{T}H0$ $1_{T}V0$ $0V1_{T}$ | $0H1_{B}$ $1_{B}V0$ $0V1_{B}$ | $1_{L}V0$ $1_{L}H0$ $0H1_{L}$ | $0V1_{R}$ $1_{R}H0$ $0H1_{R}$ | $1_{M}H0$ $0H1_{M}$ $1_{M}V0$ $0V1_{M}$ |

For example, given exclusion zone type TL, the possible ways to start a tree are represented by the following codes in Table 1: $1_{TL}H0$; $1_{TL}V0$. The code $1_{TL}H0$ indicates that a horizontal cut (H) has been formed, with the exclusion zone at location TL provided as the left child node of H. The "1" value indicates that the corresponding child node is occupied by the exclusion zone, whereas the "0" value in the code indicates that a vacant position can be filled with another node, such as a leaf node or another branch (that includes a sub-tree). Note that for an exclusion zone of the M type, there are four possible ways to start a tree—in other words, a cut can be placed on the left, right, top, or bottom of the exclusion zone in the middle.

In FIG. 2A, for exclusion zone 202 (of type TL), the corresponding code value given the horizontal cut 206 is $1_{TL}H0$. For the exclusion zone 204, (of type B), the code given the horizontal cut 206 above the exclusion zone 204 is $0H1_{B}$. The combination of these codes ($1_{TL}H0+0H1_{B}$) is $1_{TL}H1_{B}$, which is the code that represents the tree 240 (FIG. 2A) As shown in FIG. 2B, the combined code for the exclusion zones 202 and 204 given the vertical cut 212 is $1_{TL}V1_{B}$ ($1_{TL}V0+0V1_{B}$).

The combined code for the tree 244 shown in FIG. 2C starts with the code ($1_{TL}V1_{B}$) of FIG. 2B. Once the root node 248 in FIG. 2C is added, the code becomes ($1_{TL}V1_{B}$)H0.

If there is just one exclusion zone on a page, then the possible layouts given this one exclusion zone is represented by the trees corresponding to the possible codes indicated in Table 1 above. For example, if the exclusion zone is of type M, then there would be four possible layouts corresponding to the four codes listed in the last column of Table 1. These four possible layouts would be considered the four candidate layouts to be used as four corresponding templates for insertion of images on the left, right, top, or bottom of this exclusion zone.

If there are two exclusion zones on a page, then the possible layouts are formed by combining respective pairs of codes corresponding to the two exclusion zones. A code for the first exclusion zone can be combined with a code for the second exclusion zone if the respective codes represent the same type of cut (either the horizontal cut or a vertical cut). For example, if the first exclusion zone is of type TL and the second exclusion zone is of type B, then the code $1_{TL}H0$ for exclusion zone TL can be combined with code $0H1_{B}$ for exclusion zone B, since these are the codes for a horizontal cut. It is not valid to combine $1_{TL}H0$ with $0V1_{B}$, for example, since $0V1_{B}$ corresponds to a vertical cut layout for exclusion zone B while $1_{TL}H0$ corresponds to a horizontal cut for exclusion zone TL. Moreover, another restriction is that after combination, the code has to have form 1H1 or 1V1. Combining code $1_{TL}V0$ for exclusion zone TL with code $1_BV0$ for exclusion zone B would not be a valid combination, since that would not result in form 1V1, where one exclusion zone occupies the left child node and one exclusion zone occupies the right child node. Stated differently, two exclusion zones cannot both occupy the same child node of a respective cut node (a cut node represents a cut, either a horizontal cut or a vertical cut).

FIG. 5 is a flow diagram of techniques according to some implementations for forming a layout for two exclusion zones. The layout codes of the corresponding two exclusion zones for the same type of cut are combined (at 502) to form a combination layout code. In other words, a layout code for the first exclusion zone for a horizontal cut can be combined with a layout code of a second exclusion zone for a horizontal cut. Similarly, a layout code for the first exclusion zone for a vertical cut can be combined with a layout code for a second exclusion zone for a vertical cut. The combination performed at 502 is subject to the restriction that the combination has to produce output of form 1H1 or 1V1 (in other words, the output layout is of the form where the two exclusion zones occupy two different respective child nodes of the corresponding cut node).

After combining the layout codes of the respective exclusion zones to form a combination layout code, the corresponding layout represented by the combination layout code is validated (at 504). The validation checks to see whether the corresponding cut (horizontal cut or vertical cut) intersects any of the exclusion zones. In the example of FIG. 2A or 2B, the horizontal cut 200 or vertical cut 212 would be considered a valid cut since neither intersects any part of exclusion zone 202 or 204. On the other hand, the horizontal cut 310 shown in FIG. 3B is not a valid cut, since it intersects at least one of the exclusion zones 302 and 304. Therefore, the layout of FIG. 3B would be considered an invalid layout.

Validating whether a particular cut is valid is based on checking a vertical projection (for a horizontal cut) or a horizontal projection (for a vertical cut).

Consider a two-dimensional page of pixels with pixel value at [i, j] position represented as p[i][j]:
if [i, j] it is not inside either one of the blocks representing exclusion zones, then p[i][j]=0;
else p[i][j]=1: (the pixel is enclosed inside one of the exclusion zones).

A horizontal projection value h[j]=1 if the sum of the pixel values along the jth column is larger than 0, else h[j]=0. Similarly a vertical projection value v[i]=1 if the sum of the pixel values along the ith row is larger than 0, else v[i] is 0. More formally, $$h[j] = \begin{cases} 1 & \text{if } \sum_i p[i][j] > 0 \\ 0 \end{cases}$$

$$v[i] = \begin{cases} 1 & \text{if } \sum_j p[i][j] > 0 \\ 0 \end{cases}$$

Given the horizontal cut, a vertical projection code is formed by a sequence of the vertical projection values v[i], i=0, 1, . . . , n, where n represents the number of rows of pixels on the page. Such sequence of the vertical projection values v[i] for the example of FIG. 2A is 111 . . . 1000111 . . . 1000 . . . , for example. The "1" values occur where a row i on the page 200 includes a part of the exclusion zone 202 or 204. The "0" values occur where a row i on the page 200 includes neither the exclusion zone 202 nor exclusion zone 204. Continuous "1"s are collapsed into a single "1" while continuous "0"s are collapsed into a single "0" value. Thus, in the foregoing example, collapsing of the "1"s and "0"s would result in the following vertical projection code: 1010.

For the example of FIG. 3B, the sequence of vertical projection values v[i], i=1, 2, . . . , n, can be as follows, for example: 111111 . . . 11. Note that in this sequence, there are no "0"s, since all the rows i intersect at least one of the exclusion zones 302 and 304. Collapsing the foregoing continuous "1"s results in the following vertical projection code; 1.

Referring again to FIG. 5, it is determined (at 506) whether the projection code produced at 504 has a "101" sub-sequence in the string. If so, then the corresponding cut is a valid cut. For the example of FIG. 2A, where the projection code is 1010, there is a sub-sequence "101" in the projection code, and therefore, the cut 206 is a valid cut. On the other hand, since the projection code (1) for the horizontal cut 310 of FIG. 3B does not have a sub-sequence "101", the horizontal cut 310 of FIG. 3B is an invalid cut. The sub-sequence "101" indicates that there is a gap, represented by the "0" in the sub-sequence, in which a valid cut can be provided without intersecting any exclusion zone.

Computing the vertical or horizontal projection code to validate a cut is a relatively efficient way of performing such validation, since the vertical or horizontal projection code can be quickly computed, and the search for presence of the sub-sequence "101" is a relatively fast process.

In addition, in accordance with some implementations, the tree produced by making the corresponding cut can be mutated (at 508) if predefined criteria are satisfied. As discussed above in connection with FIG. 2C, the mutation of the tree is performed by adding a root node to a tree (e.g., adding root node 248 in FIG. 2C). Adding a root node is possible if there is a "01" at the beginning of the projection code, or a "10" at the end of the projection code. In one example, assume that the current valid tree is 1H1. If the projection code for this tree starts with a "01", then it is possible to add a root node (V) to form 0V(1H1). On the other hand, if the projection code ends with a "10", then it is possible to add a root node (B) to form the following tree: (1H1)V0.

Similar addition of root nodes are possible for a valid tree 1V1, to form one of the following: 0H(1V1) or (1V1)H0.

In task 508, the projection code that is checked for 1H1 is the horizontal projection code, whereas the projection code that is checked for 1V1 is the vertical projection code. Note that such checking differs from the checking performed at 506, where the vertical projection code is checked for 1H1 to determine whether the horizontal cut is valid, and the horizontal projection code is checked for 1V1 to determine whether the vertical cut is valid.

Additional exclusion zones can be added after the first two exclusion zones. To add an additional exclusion zone, the layout technique attempts to insert the additional exclusion zone at different tree node locations, with the placement validated by checking the cuts of the parent nodes and the sibling node. For any existing node in a previous tree, there are four options to add a new exclusion zone by replacing the existing node with one of the trees depicted in FIGS. 6A-6D. FIGS. 6A-6D depict options 1-4, respectively. Starting with the exclusion zones 202 and 204 shown in FIGS. 2A-2C (which include TL and the R exclusion zones), it is assumed that it is desired to add a B exclusion zone. Starting with the tree depicted in FIG. 2A, represented by code $1_{TL}H1_B$, there is no valid insertion at node position TL in tree 240 shown in FIG. 2A, because the parent node has the "H" cut and TL is a left (or top) child. However, at the "R" node position in the tree 240 of FIG. 2A, for the "B" exclusion zone, option 2 and option 3 (depicted in FIGS. 6B and 6C) are possible insertions at the "R" node position. The option 2 insertion is depicted in FIG. 7A whereas the option 3 insertion is depleted in FIG. 7B.

Figure 6A:
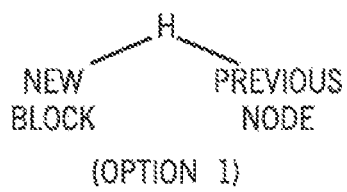
FIGS. 6A-6D illustrate various options of branches that can be inserted into trees representing layouts, in accordance with some examples.
Figure 6B:
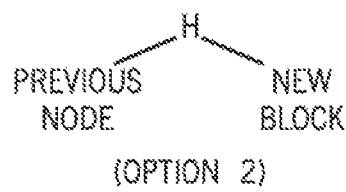
Figure 6C:
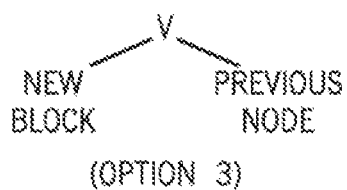
Figure 6D:
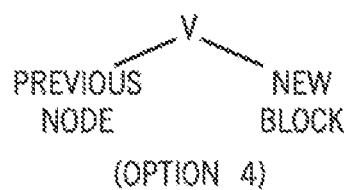
Figure 7A:
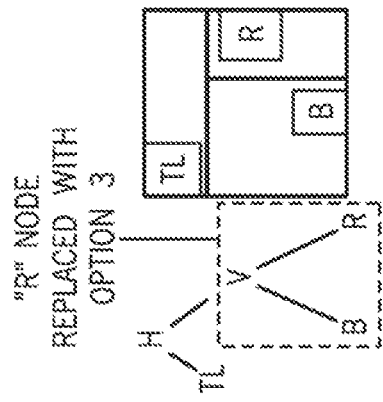
Figure 7B:
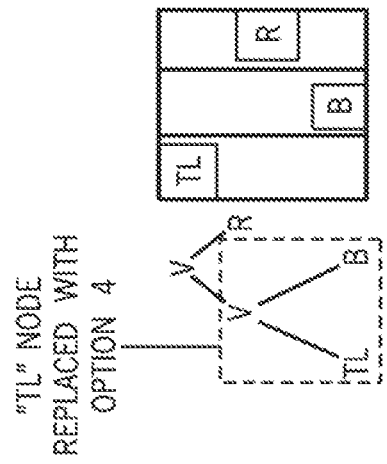
Figure 8A:
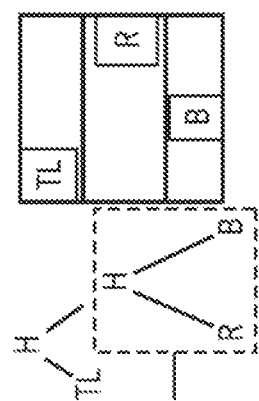
Figure 8B:
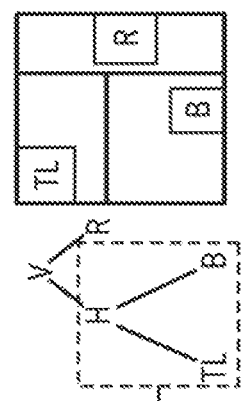

When the tree 242 of FIG. 2B is considered as the starting point, because the parent node has the "V" cut and "TL" is a left child, the valid insertions at the "TL" node position include option 2 or option 4, depicted in FIG. 6B or 6D, respectively. The insertion of option 2 at the "TL" node position of tree 242 in FIG. 2B is illustrated by FIG. 8A, while the insertion of option 4 at the "TL" node position in the tree 242 of FIG. 2B is illustrated by FIG. 8B.

Alternatively, starting with the tree 242 shown in FIG. 2B, the "R" position can be replaced with either option 2 or option 3 depicted in FIG. 6B or 6C, respectively. Such corresponding replacements are depicted in FIGS. 9A and 9B, respectively.

As yet a further alternative, assuming that the starting tree is tree 244 shown in FIG. 2C, the "B" exclusion zone is added to the emtpy slot 250 in the tree 244, as shown in FIG. 10.

Each replacement of a particular node position of a starting tree with a branch represented by any of FIGS. 6A-6D is validated by examining the combined projection code as discussed above in connection with FIG. 5.

Based on the foregoing, it is noted that there are six unique combinations of trees (shown in FIGS. 7A, 7B, 8A, 8B, 9A, and 10) for three exclusion zones. Note that FIG. 9B is not listed above since FIG. 9B depicts the same layout as FIG. 8B.

If additional exclusion zones are to be added, the process discussed above can be re-iterated to generate additional possible layouts.

C. Inserting Images into Templates

Techniques according to various implementations are provided to insert images into a template that contains exclusion zone(s). In some implementations, a "through selection" layout technique is used (as discussed in Section C.1 below). In other implementations, an "active constraints" layout technique is used (as discussed in Section C.2 below).

1. Through Selection Layout Technique

The through selection layout technique starts with a set of possible initial trees (candidate templates) with exclusion zones as existing leaf nodes. Images are added to leaf nodes of each initial tree recursively one by one. After each image insertion, the generated layouts are evaluated and validated. The generated layouts are ranked based on various factors, including at least one of the following, for example: (1) a score based on non-overlapping of images with exclusion zones; (2) a score based on image size; (3) a score based on alignment of an image with the center of the page; and (4) a score based on continuity of the images. In other examples, layouts can be ranked on alternative or additional factors. Layouts with the top scores are selected and sent to the next recursive step for insertion of the next image. The through selection layout technique works well for exclusion zones that are relatively small in size.

Figure 11:
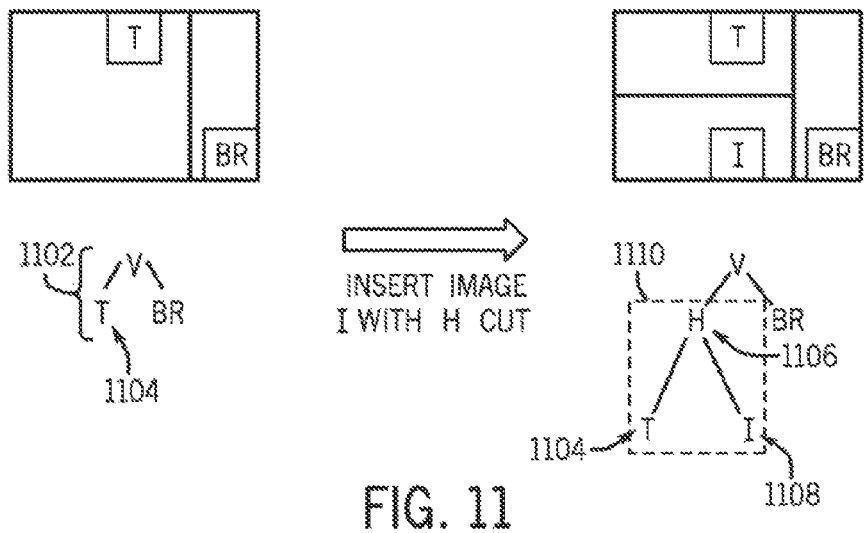
FIG. 11 illustrates insertion of an image into a layout having exclusion zones, according to some examples.

FIG. 11 shows an example of inserting an image I into a template having exclusion zones T and BR. The tree for such a template (assuming a vertical cut V is used) is tree 1102. To insert image I, a non-root node (in this example node 1104) is replaced with a cut node (which in the example of FIG. 11 is a cut node 1106 for a horizontal cut). The replaced node (1104) is positioned as one of the leaf nodes of the cut node 1106. The inserted image I is provided as the other leaf node (1108) of the cut node 1106. The positioning of the leaf node 1108 for the image I considers the type of the exclusion zone in the branch (1110) under consideration. If the new cut node is a horizontal cut, if the replaced node has a T, TL, or TR exclusion zone, the image I is placed as the right child leaf node (such as depicted in FIG. 11)—in other words, the exclusion zone has to occupy the top side and the image is placed on the bottom side of the horizontal cut. On the other hand, if the replaced node has a B, BL, or BR exclusion zone, then the image I is placed as the left child leaf node of the horizontal cut as the top side of the horizontal cut.

Similarly, for any tree branch (e.g., 1110 in FIG. 11) under consideration that contains an L, TL, or BL type exclusion zone, an image cannot be added as the left child of a vertical cut in this branch. For any tree branch under consideration containing an R, TR, or BR exclusion zone, an image cannot be added as the right child of a vertical cut. Other restrictions also exist in other scenarios.

In some implementations, the through selection layout technique is a technique that maps the tree to the layout with a linear equation solver and then evaluates layouts based on calculation of scores as noted above. In some cases, it is assumed that the aspect ratio of a partition corresponding to a leaf node containing an exclusion zone is the same as the bounding box of the exclusion zone. In other cases, different aspect ratios can be assumed for the exclusion zone; different layouts can be mapped from the tree and be evaluated. The "bounding box" of the exclusion zone refers to the outer boundary of the exclusion zone. When a layout is generated for insertion of an image, it is possible that a mapped partition (rectangle) for an exclusion zone may not be large enough to enclose the exclusion zone, such that an image may overlap the exclusion zone. This situation is addressed by assigning a penalty when such overlap occurs, such that it would be unlikely for a layout having overlapping of an image with an exclusion zone to be selected.

After insertion of an image that produces a layout (such as depicted in FIG. 11), a layout score is calculated:

Layout score = exclusion zone score
    (based on non-overlapping of image with exclusion zone) +
    image size score (based on size of image) +
    image center score (based on aligning the images with the center
    of the page to provide a measure of visual balance) +
    image continuity score (based on continuity of images on the page).

Note that, in some implementations, the image center score and image continuity score are applied for generation of the layout score at a final step (after all images to be inserted have been laid out). In other words, during the recursive insertion of images that produce respective intermediate layouts (layouts before all images have been inserted), the layout score for each of the intermediate layouts is calculated based on just the exclusion zone score and the image size score. After all images to be inserted have laid out, the layout score for each layout is calculated based on all four of the scores above.

In other implementations, the layout scores of layouts can be calculated in other ways.

In some implementations, the image size score for calculating the layout score is based on a comparison of ideal image areas for the images, to the actual image areas. If an image area for a particular image is smaller than the corresponding ideal image area, then the corresponding image size score for the particular image is penalized. If an image area for the particular image is not smaller than the corresponding ideal image area, then no penalty is assigned the image size score. Effectively, an image size score for an image that is smaller than the corresponding ideal image area is smaller than an image size score for the image that is not smaller than the corresponding ideal image area. Further details regarding calculation of the image size score are described in C. Brian Atkins, "Blocked Recursive Image Composition," Proceedings of the ACM Multimedia 2008, pp. 821-824 (2008).

The exclusion zone score is calculated based on a determination of whether the exclusion zone is contained within the partition (mapped rectangle) corresponding to the exclusion zone. A mapped rectangle is compared to the corresponding actual exclusion zone. For the $i^{th}$ exclusion zone, its area is denoted as $e_i$. The corresponding mapped rectangle for the $i^{th}$ exclusion zone is denoted $r_i$. The individual exclusion zone score ($S_i$) is computed as follows:

$$S_i = \begin{cases} \dfrac{e_i \cap r_i}{r_i} & \text{if } e_i \subseteq r_i; \\ -p * \left(1 - \dfrac{e_i \cap r_i}{r_i}\right); & \text{else if } e_i \not\subseteq r_i; \end{cases} \quad \text{(Eq. 1)}$$

According to the above, if the exclusion zone $e_i$ is enclosed within the corresponding mapped rectangle $r_i$ ($e_i \subseteq r_i$), then the exclusion zone score $S_i$ is equal to the area of intersection of the exclusion zone and the mapped rectangle, divided by the area of the mapped rectangle. However, if the exclusion zone $e_i$ is not enclosed within the corresponding mapped rectangle $r_i$ ($e_i \subset r_i$), then a penalty factor (p) is applied as in the Eq. 1 above, in some examples, the penalty factor (p) is 10, or alternatively, it can be some other value. If there are multiple exclusion zones, then the overall exclusion zone score is the sum (or other aggregate) of $S_i$ (for i=1 to n, where n represents the number of exclusion zones).

Other techniques of assigning exclusion zone scores can be used in other implementations. For example, for the case where the exclusion zone is enclosed by the corresponding mapped rectangle, the exclusion zone score can be equal to the area of the exclusion zone divided by the area of the mapped rectangle. On the other hand, where the exclusion zone is not enclosed by the corresponding mapped rectangle, then a negative exclusion zone can be assigned, which can be a constant negative value (e.g., −10 or some other negative value).

Figure 12A:
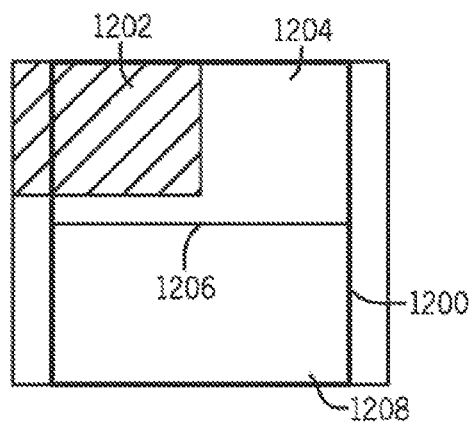
FIGS. 12A and 12B illustrate exclusion zone and image partitions within an overall region defined by a bounding box, in accordance with some examples.
Figure 12B:
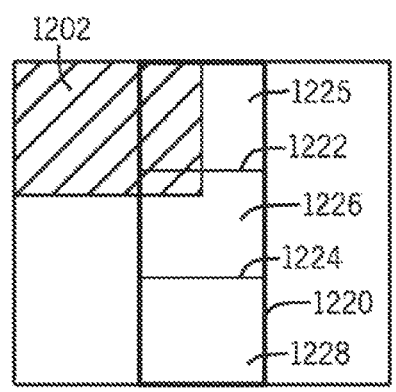

FIG. 12A illustrates an example where an exclusion zone 1202 is enclosed by a corresponding mapped rectangle 1204. In the example of FIG. 12B, the overall region in which images can be placed is represented by bounding box 1200. The overall region (1200) can include exclusion zones and images. In the example of FIG. 12A, a horizontal cut 1206 divides the overall region (1200) into two partitions: an upper partition (the rectangle 1204), and a lower partition (rectangle 1208 in which an image is placed). Since the exclusion zone 1202 is enclosed within the rectangle 1204, the exclusion zone score for the exclusion zone 1202 is a positive value as computed according to Eq. 1 above for the case where $e_i \subseteq r_i$.

Note that a portion of the exclusion zone 1202 in FIG. 12A lies outside the bounding box 1200. This situation does not present an issue since images are not allowed to be placed outside the bounding box 1200. Note that the bounding box 1200 represents the overall region that corresponds to the root node of the tree representing the layout of FIG. 12A. For purposes of computing the exclusion zone score, it is the area of the exclusion zone 1202 within the bounding box 1200 that is considered in Eq. 1, in accordance with some examples.

FIG. 12B illustrates an example in which a mapped rectangle does not enclose the exclusion zone 1202. A bounding box 1220 defines the overall region (corresponding to the tree root node) in which images can be inserted. The bounding box 1220 of FIG. 12B is smaller than the bounding box 1200 of FIG. 12A in view of the primary and secondary criteria considered by the layout technique as discussed above. In the example of FIG. 12B, two horizontal cuts 1222 and 1224 divide the overall region (1220) into three rectangles 1225, 1226, and 1228. Note that neither partition 1225 nor 1226 encloses the exclusion zone 1202 area within the bounding box 1220. As a result, the exclusion zone score in this scenario is calculated according to Eq. 1 for the case $e_i \subset r_i$, and is assigned a negative value to penalize for the fact that the exclusion zone 1202 is not enclosed by the corresponding mapped rectangle.

Figures 13A, 13B:
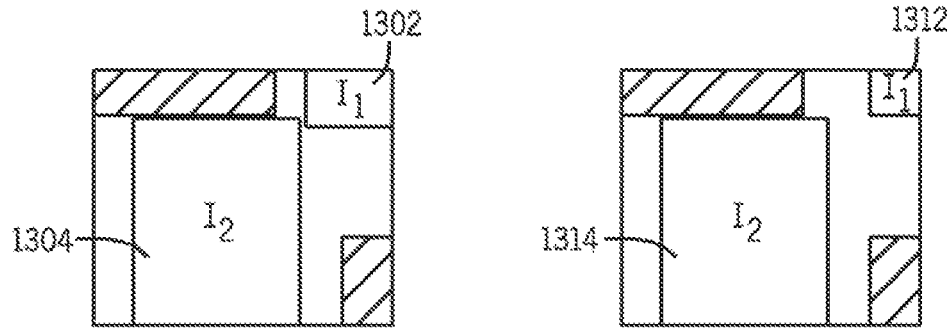
FIGS. 13A and 13B illustrate alternative layouts of images and exclusion zones to illustrate computation of an image continuity score, according to some examples.

The image continuity score for computing the layout score as discussed above is based on a measure of continuity of images in the layout. If the images are spaced relatively close to each other, as depicted in FIG. 13A which shows image 1302 relatively close to image 1304, then the image continuity score is a higher score (e.g. +1 in FIG. 13A). On the other hand, if the images are relatively far apart (such as images 1312 and 1314 in FIG. 13B), then a lower image continuity score is assigned (e.g., −1). In some examples, a +1 score is assigned if the images are within some predefined distance of each other, and a −1 score is assigned if the images are greater than the predefined distance from each other. Alternatively, the image continuity score can be computed as a measure inversely proportional to the distance between images.

The image center score is based on how close image region centers are to the center of the page. The center of the $i^{th}$ image region is denoted as ($x_i$, $y_i$)—the width of this region is $w_i$ and its height is $h_i$. The center of mass of the image regions can then be computed as:

$$c_x = \dfrac{\sum_{i=1}^{N_p} x_i w_i h_i}{\sum_{i=1}^{N_p} w_i, h_i};$$

$$c_y = \dfrac{\sum_{i=1}^{N_p} x_i w_i h_i}{\sum_{i=1}^{N_p} w_i, h_i};$$

where $N_p$ is the total number of images on the page.

The center of the page on which the images are placed is denoted as ($p_x$, $p_y$). If the background artwork associated with the exclusion zones specifies that there should be horizontal symmetry, the horizontal distance between the center of the page, $p_x$, and $c_x$ is calculated as $d_x = |p_x - c_x|$, which is used to rank the layout. Similarly, to achieve vertical symmetry, the vertical center distance $d_y = |p_y - c_y|$, is used to rank the layout. If no symmetry (vertical or horizontal) is specified for the background art, the total distance, computed as $\sqrt{d_x^2 + d_y^2}$, is used for ranking the layout. A more centered layout is desirable.

Figure 14:
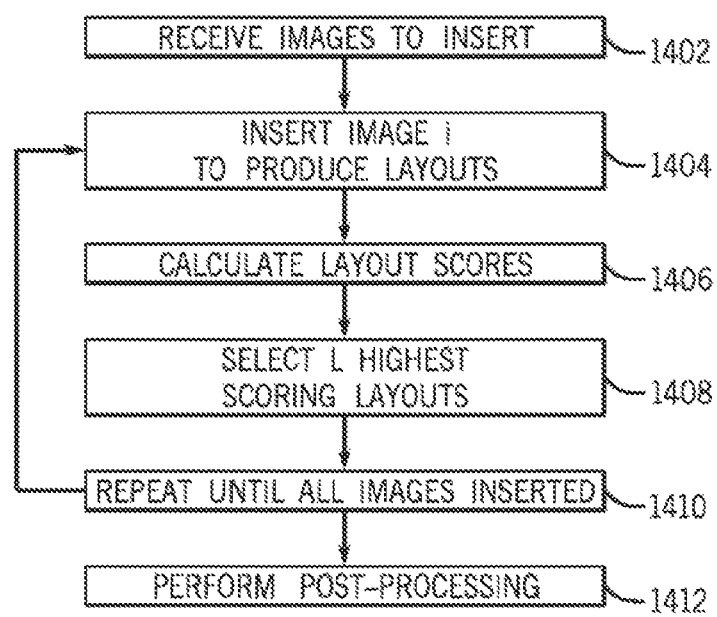
FIG. 14 is a flow diagram of an image layout technique, according to some examples.

FIG. 14 illustrates a process of recursively inserting images in sequence one at a time. Images to be inserted are received (at 1402). The $i^{th}$ image (where i starts with 1) is inserted into existing layouts; for the first image, i=1, the existing layouts are the candidate templates generated in Section B above.

Inserting (at 1404) image i into the existing layouts produces corresponding output layouts. Layout scores are calculated (at 1406) for the corresponding output layouts as discussed above. In some examples, each layout score is based on just the exclusion zone score and image size score, and not the image continuity score and image center score. The L (L>1) highest scoring output layouts are selected (at 1408) to use in the next stage, and the tasks 1404-1408 of FIG. 14 is repeated (at 1410) for the next image i (by incrementing i).

After all the images have been inserted, post-processing is performed (at 1412). Alternatively, the post-processing (1412) can be part of the bop of FIG. 14. Post-processing includes computing revised layout scores for the layouts produced by the last stage (in which all images have been inserted). The revised layout scores take into account the image continuity score and the image center score, in addition to the exclusion zone score and image size score, as discussed above. The revised layout scores allow for the layouts to be re-ranked to allow a user to select from among the layouts based on the ranking.

The through selection layout technique according to some implementations is computationally efficient and can be performed relatively quickly. The through selection layout technique also works relatively well for a relatively large number images to be inserted, since it is a computationally efficient technique.

2. Active Constraints Layout Technique

If there is a relatively large exclusion zone on a page, such as an exclusion zone that takes up more than one-third of the overall region in a page in which images are to be inserted, then it can be challenging to find a valid layout in which the images do not overlap exclusion zones (a layout that satisfies primary criterion (a) noted in Section A above).

In such scenarios, the active constraints layout technique can be applied. In some examples, the active constraints layout technique can be applied after performance of the through selection layout technique. For example, the active constraints layout technique can be performed in the post-processing task (1412) depicted in FIG. 14. In this case, the active constraints layout technique is used to optimize the layout(s) selected using the through selection layout technique.

Alternatively, the active constraints layout technique can be performed independently of the through selection layout technique.

The active constraints layout technique actively enforces layout constraints and resolves the constraints with a constraint solver. Instead of solving the equations in linear system as in the through selection layout technique, the constraint solver can solve inequality constraints. Special inequality constraints are assigned regarding the exclusion zones when mapping the layout tree to the layout.

As with the through selection layout technique, the active constraints layout technique starts with initial tree(s) (template(s)) having exclusion zones as existing leaf nodes. Images are then added to the leaf nodes of the tree one by one, subject to presence of exclusion zones.

Different equality and inequality constraints with various strengths are given to each internal node, image node, and exclusion zone node. A simplex constraint solver is used to resolve all the constraints in order to obtain valid layouts that satisfy the constraints. In some examples, the constraint solver can be a Cassowary Constraint Solver.

For each node in the layout tree, there are four variables: x (coordinate in the x or horizontal axis), y (coordinate in the y or vertical axis), width, height.

Figure 15:
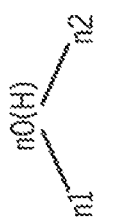
FIG. 15 illustrates an example layout tree.

FIG. 15 depicts a tree having an internal (or cut) node n0 (that represents a horizontal cut in the example) and child nodes n1 and n2. The following equality constraints are specified for the internal node n0:
n0·width=n1·width=n2·width; (for width)
n0·height=n1·height+n1·height; (for height)
n0·x=n1·x;
n0·y=n1·y.

The following equality constraints are specified for the leaf nodes n1 and n2 in FIG. 15:
if the leaf node is for an image:
n0·height=n0·width*image_aspect_ratio (where image_aspect_ratio represents the aspect ratio of the image);
else if the leaf node is for an exclusion zone, there is no equality constraint.

The following inequality constraints are specified for nodes of a layout tree. If the node is for an image, then make the image as large as possible (close to the page size), and make the image as centered as possible. If the node is a root node of the layout tree, then make the region for the root node as centered on the page as possible. If the node is for an exclusion zone, then the inequality constraints depend on the type of exclusion zone, as discussed below.

Figure 16A:
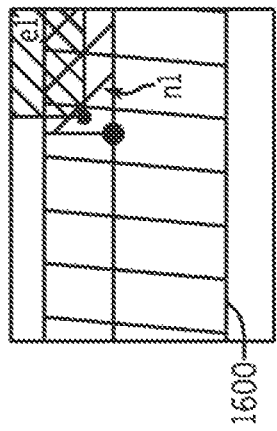
FIGS. 16A-16D, 17A-17E, and 18A-18C illustrate various layouts corresponding to different types of exclusion zones and relative overlapping of the exclusion zones with respective mapped partitions, in accordance with some examples.

Referring to FIG. 16A, a bounding box 1600 corresponds to the root node and defines the overall region in which images can be inserted. A rectangle corresponding to node n1 for the exclusion zone e1 is defined in the layout depicted in FIG. 16A. In this example, the exclusion zone e1 is of type TL. The inequality constraints for this type of exclusion zone e1 is as follows:
n1·right>e1·right;
n1·bottom>e1·bottom.

Figure 16B:
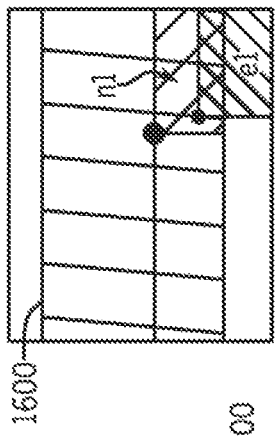

For a TR exclusion zone e1 as shown in FIG. 16B, the inequality constraints is as follows:
n1·left<e1·left;
n1·bottom<e1·bottom.

Figure 16C:
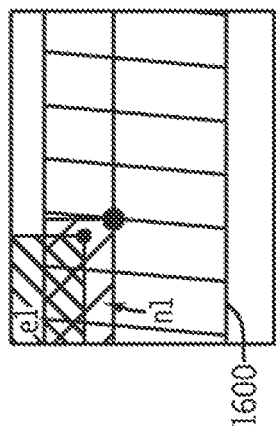

For a BL exclusion zone e1 as shown in FIG. 16C, the inequality constraints for this type of exclusion zone e1 is as follows:
n1·right>e1·right;
n1·top<e1·top.

Figure 16D:
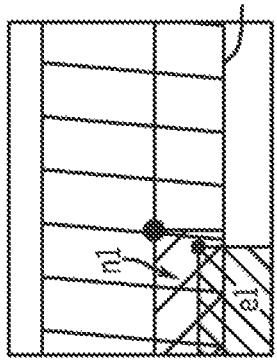

For a BR exclusion zone e1 as shown in FIG. 16D, the inequality constraints for this type of exclusion zone e1 is as follows:
n1·left<e1·left;
n1·top<e1·top.

Figure 17A:
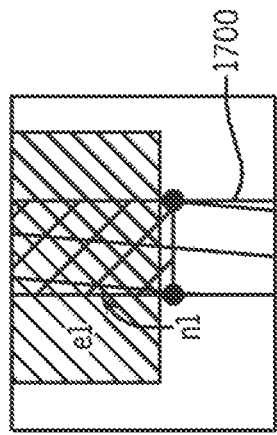
Figure 17B:
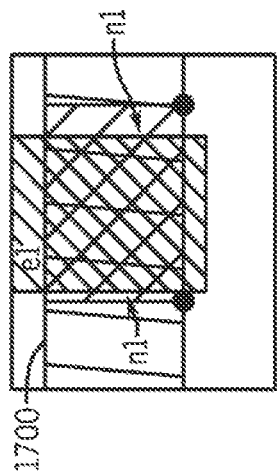
Figure 17C:
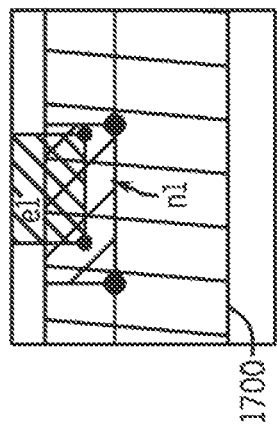

For an exclusion zone on a side (T, B, L or R), there can be multiple possibilities. For a T exclusion zone e1, for example, there are three possible cases, as depicted in FIGS. 17A-17C. Bounding box 1700 in each of FIGS. 17A-17C represent the overall region in which images can be inserted. Case 1 depicted in FIG. 17A has a relatively small T exclusion zone e1, in which case the following inequality constraints apply:
n1·left<e1·left;
n1·right>e1·right;
n1·bottom>e1·bottom.

Case 2 depicted in FIG. 17B has a relatively large T exclusion zone e1 (which extends beyond the horizontal boundaries of the bounding box 1700 for the root node), in which case the following inequality constraints apply:
n1·top=root·top;
n1·bottom=root·bottom;
n1·left<e1·left;
n1·right>e1·right.

Case 3 depicted in FIG. 17C has a relatively large T exclusion zone e1 (which extends beyond the vertical boundaries of the bounding box 1700 for the root node), in which case the following inequality constraints apply:

n1·left=root·left;
n1·right=root·right;
n1·bottom>e1·bottom.

Figure 17D:
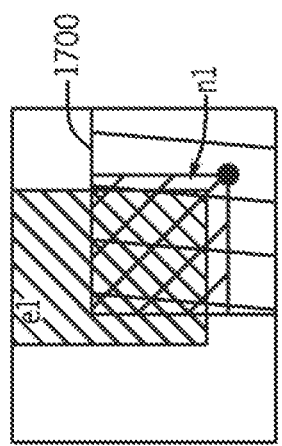
Figure 17E:
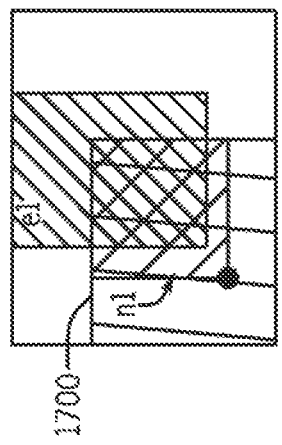

FIGS. 17D and 17E depict another two possible cases. For FIG. 17D, the following inequality constraints apply:

n1·top=root·top;
n1·right=root·right;
n1·left<e1·left
n1·bottom>e1·bottom.

For FIG. 17E, the following inequality constraints apply:

n1·top=root·top;
n1·left=root·left;
n1·right<e1·left;
n1·bottom>e1·bottom.

Similar constraints can exist for the multiple cases for each of the other types of side exclusion zones. In view of the multiple possible cases for a side exclusion zone such as the top zone depicted in FIGS. 17A-17E, the constraint solver may have to be run multiple times to consider the multiple possible cases.

Figure 18A:
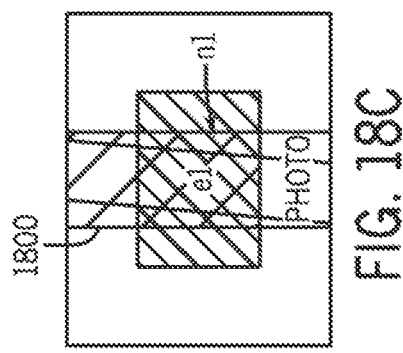
Figure 18B:
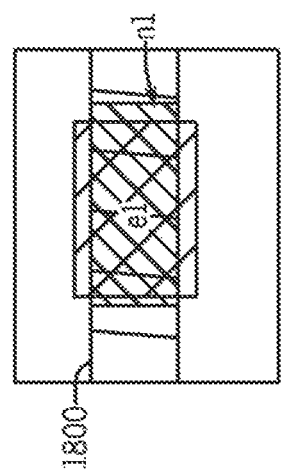
Figure 18C:
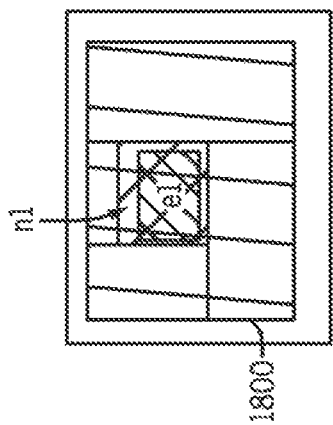

For the middle (M) exclusion zone, multiple cases also exist, such as depicted in FIGS. 18A-18C. In each of FIGS. 18A-18C, bounding box 1800 represents the overall region in which images can be inserted. The inequality constraints for these cases are as follows.

FIG. 18A:
n1·top<e1·top;
n1·bottom>e1·bottom;
n1·left<e1·left;
n1·right>e1·right.

FIG. 18B:
n1·top=root·top;
n1·bottom=root·bottom;
n1·left<e1·left;
n1·right>e1·right.

FIG. 18C:
n1·left=root·left;
n1·right=root·right;
n1·top<e1·top;
n1·bottom>e1·bottom.

Other cases are also possible for the M exclusion zone, with corresponding similar inequality constraints specified for such other cases.

Once the layouts are generated by the constraints solver, the scoring functions for computing the layout score as discussed in Section C.1 above can be used to allow for ranking of multiple valid layouts and selection from among the valid layouts based on the ranking.

In the foregoing discussion, it was assumed that the aspect ratio of a partition corresponding to a leaf node containing an exclusion zone is the same as the bounding box of the exclusion zone. However, in alternative implementations, this can be relaxed, with the aspect ratio of the mapped partition for the exclusion zone varied to allow the solver to potentially find better solutions.

The benefits of using the active constraints layout technique are that it automatically places images around exclusion zones, such as the primary criterion (a) discussed in Section A can be satisfied. The active constraints layout technique can work well for cases in which the through selection layout technique is unable to produce a valid layout. Moreover, the active constraints layout technique can be used to optimize the layout output by the through selection layout technique.

D. System Environment

Figure 19:
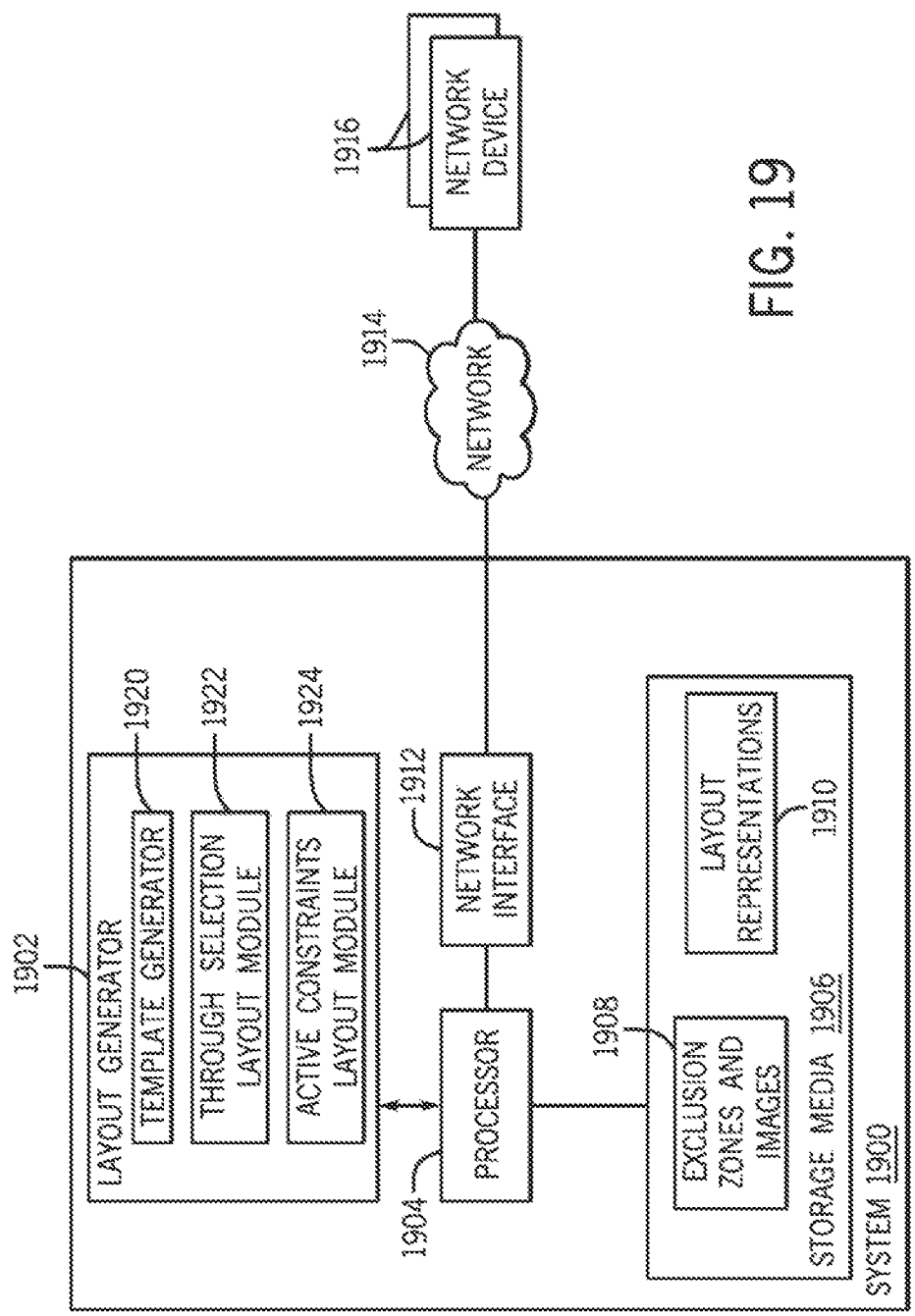
FIG. 19 is a block diagram of an example system incorporating some examples.

FIG. 19 illustrates an example arrangement that includes a system 1900 incorporating some implementations. The system 1900 includes a layout generator 1902 that is executable on one or multiple processors 1904. The processor(s) 1904 is (are) connected to storage media 1906. The storage media 1906 contains representations 1908 of images and exclusion zones that are to be provided on a page (or pages). The representations 1908 are provided as inputs to the layout generator 1902.

The layout generator 1902 includes a template generator 1920 that performs template generation as discussed in Section B above. The layout generator 1902 also performs layout generation to insert images into the templates, such as according to FIGS. 1A and 14. The layout generator 1902 includes a through selection layout module 1922 to perform the through selection layout technique as discussed in Section C.1, and an active constraints layout module 1924 to perform the active constraints layout technique as discussed in Section C.2. The layout generator 1902 produces layout representations 1910, where each layout representation represents a layout that contains exclusion zones and images.

The processor 1904 is connected to a network interface 1912 which connects the system 1900 to a network 1914. Various network devices 1916 are connected to the network 1914. The network devices 1918 can provide input data to the system 1900, such as images to be inserted into the templates.

The layout generator 1902 can include machine-readable instructions that are loaded for execution on processor(s) 1904. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above, it is intended that the appended claims cover such modifications and variations.

What is claimed is:
1. A method comprising:
receiving, by a system having a processor, a template comprising partitions on a page, the template including an exclusion zone contained in a partition of the partitions, wherein the exclusion zone defines a corresponding area of the page where content to be inserted in the page is not allowed; and producing, by the system, a particular layout defining plural partitions on the page, wherein the particular layout includes the exclusion zone and the content having a plurality of elements that are inserted into the template by recursively defining the plural partitions on the page, wherein the exclusion zone and the elements of the content are provided in respective partitions of the plural partitions, and wherein recursively defining the plural partitions considers presence of the exclusion zone.

2. The method of claim 1, wherein producing the particular layout comprises recursively inserting the plurality of elements in sequence, and wherein in response to an insertion of a particular element of the plurality of elements:

generating different layouts each including the exclusion zone and the particular element;

computing scores for the generated layouts;

selecting a subset less than all of the generated layouts based on the computed scores; and providing the selected layouts to a next processing stage to insert a next element of the plurality of elements.

3. The method of claim 2, wherein computing the scores comprises computing scores based on a first score that is based on whether or not a partition mapped to the exclusion zone encloses the exclusion zone, and a second score that is based on a size of the particular element.

4. The method of claim 2, further comprising:

inserting the next element into the selected layouts;

generating further layouts each including the exclusion zone and the particular element and the next element;

computing further scores for the generated further layouts; and selecting one of the generated further layouts based on the computed further scores.

5. The method of claim 4, wherein computing the further scores comprises computing the further scores based on:

a first score that is based on whether or not a partition mapped to the exclusion zone encloses the exclusion zone, a second score based on sizes of the elements, a third score based on continuity of the elements, and a fourth score based on centering of the elements.

6. The method of claim 1, wherein recursively defining the plural partitions on the page comprises:

defining constraints to be satisfied when inserting the plurality of elements; and generating layouts containing the plural partitions according to the constraints.

7. The method of claim 6, wherein the constraints include constraints for the partition containing the exclusive zone, wherein different constraints are specified for different types of the exclusive zone.

8. The method of claim 7, wherein the constraints further include constraints for partitions containing the elements and for a region containing a cut defining respective partitions.

9. The method of claim 1, wherein the recursive defining of the plural partitions on the page comprises recursively defining the plural partitions starting with the partitions of the template.

10. The method of claim 1, wherein the template includes plural exclusion zones, and the template is represented by a tree including a root node and leaf nodes, the leaf nodes representing the exclusion zones, and wherein a given element of the plurality of elements is inserted into the template by replacing a given leaf node of the leaf nodes with a cut node in the tree, the cut node representing a cut that divides a portion of the page between partitions, the cut node having child nodes that represent, respectively, the given element and the exclusion zone represented by the given leaf node.

11. The method of claim 1, further comprising:

computing a score for the particular layout, wherein computing the score comprises:

in response to determining that the partition containing the exclusion zone does not enclose the exclusion zone, applying a penalty in computing the score; and in response to determining that the partition containing the exclusion zone does enclose the exclusion zone, calculating the score based on relative areas of the exclusion zone and the partition containing the exclusion zone; and selecting the particular layout to output based on the computed score and scores computed for other layouts that include the exclusion zone and the plurality of elements.

12. An article comprising at least one non-transitory machine-readable storage medium storing instructions that upon execution cause a system to:

receive information relating to an exclusion zone to be provided on a page, wherein the exclusion zone defines a corresponding area of the page that is free of content to be inserted in the page;

produce a particular layout defining plural partitions on the page, wherein the particular layout includes the exclusion zone and the content having a plurality of elements that are inserted by recursively defining the plural partitions on the page, wherein the exclusion zone and the elements of the content are provided in respective partitions of the plural partitions, and wherein recursively defining the plural partitions considers presence of the exclusion zone; and compute a score for the particular layout, wherein computing the score comprises:

in response to determining that a partition mapped to the exclusion zone does not enclose the exclusion zone, applying a penalty in computing the score; and in response to determining that the partition mapped to the exclusion zone does enclose the exclusion zone, calculating the score based on relative areas of the exclusion zone and the partition mapped to the exclusion zone.

13. The article of claim 12, wherein the plurality of elements include a plurality of images, the instructions upon execution causing the system to:

insert a first image of the plurality of images into first layouts having the exclusion zone;

generate second layouts based on inserting the first image into the first layouts, each of the second layouts having a corresponding partition for the first image;

select a subset less than all of the second layouts; and provide the selected second layouts to a next processing stage to insert a second image of the plurality of images, wherein the particular layout is based on the selected second layouts.

14. The article of claim 13, wherein the instructions upon execution cause the system to further:

insert the second image into the second layouts;

generate third layouts based on inserting the second image into the first layouts, each of the third layouts having a corresponding partition for the second image;

select a subset less than all of the third layouts; and provide the selected third layouts to a subsequent processing stage to insert a third image of the plurality of images.

15. The article of claim 13, wherein selecting the subset of second layouts is based on layout scores assigned to corresponding second layouts, wherein the layout scores are computed based on scores relating to the exclusion zone and scores relating to the first image.

16. The article of claim 13, wherein generating the second layouts is based on constraints for a partition of the exclusion zone and constraints for the partition of the first image.

17. A system comprising:
a storage media to store representations of elements to be inserted into a page; and
at least one processor to:
receive a template comprising partitions on a page, the template including an exclusion zone contained in a partition of the partitions, wherein the exclusion zone defines a corresponding area of the page where content to be inserted in the page is not allowed, the content including the elements; and
recursively inserting the elements into the template by recursively defining plural partitions on the page, wherein the exclusion zone and the elements are provided in respective partitions of the plural partitions, and wherein recursively defining the plural partitions considers presence of the exclusion zone; and
output a particular layout including the plural partitions and the exclusion zone and the elements.

18. The system of claim 17, wherein recursively defining the plural partitions comprises:
(a) as a particular element of the elements is inserted, defining candidate layouts including different combinations of partitions;
(b) recursively selecting the candidate layouts for further insertion of a next element of the elements;
(c) inserting the next element; and
(d) repeating tasks (a), (b) and (c).

19. The system of claim 17, wherein the template includes plural exclusion zones, and the template is represented by a tree including a root node and leaf nodes, the leaf nodes representing the exclusion zones, and wherein a given element of the elements is inserted into the template by replacing a given leaf node of the leaf nodes with a cut node in the tree, the cut node representing a cut that divides a portion of the page between partitions, the cut node having child nodes that represent, respectively, the given element and the exclusion zone represented by the given leaf node.

20. The system of claim 17, wherein the at least one processor is to:
compute a score for the particular layout, wherein computing the score comprises:
in response to determining that the partition containing the exclusion zone does not enclose the exclusion zone, applying a penalty in computing the score; and
in response to determining that the partition containing the exclusion zone does enclose the exclusion zone, calculating the score based on relative areas of the exclusion zone and the partition containing the exclusion zone; and
select the particular layout to output based on the computed score and scores computed for other layouts that include the exclusion zone and the elements.

* * * * *